3,376,155
ALPHA,BETA UNSATURATED CARBOXYLIC ACID PRIMER FOR POLYESTER CONCRETE COATING

Lawrence E. O'Donnell, Tonawanda, N.Y., assignor to Hooker Chemical Corporation, Niagara Falls, N.Y., a corporation of New York
No Drawing. Filed Apr. 6, 1964, Ser. No. 357,751
4 Claims. (Cl. 117—72)

This invention relates to concrete coatings. More particularly, this invention relates to improved means of bonding organic resinous compositions to concrete.

Modern concrete floor, airport runway and taxiway and highway surfaces, while durable, shock- and weather-resistant and repairable, tend to be slippery, when wet. Furthermore, these concrete surfaces eventually erode, leaving rough, uneven surfaces. As a consequence, considerable attention has been paid to the development of surfacing materials which would provide a long-lasting inexpensive skidproof surface adherent to concrete. The compositions should, in general, be based on a flexible binder which securely bonds the skidproof abrasive constituent to the concrete surface for long periods, despite the ravages of sunshine, rain, extremes of heat and cold, and the mechanical stresses and shocks to which contemporary traffic arteries and storage areas are subjected. Various types of substances have been proposed for such a use, but they generally have limitations. In many cases, the coatings have failed to have sufficient adhesion to the grit and the concrete surface. In other cases, the coatings did not endure under exposure to all varieties of weather, from hot to freezing. In still other cases, the coatings lacked flexibility and resistance to mechanical stresses. Many of the coatings proposed have been expensive or difficult to apply.

In general, a thermosetting resin is required for concrete coating applications to provide the strength necessary to resist shoving on hot days or when heat is generated by friction from skidding. Moreover, such a resin should resist attack from oil, gasoline or other chemicals or solvents which are occasionally spilled upon it in the normal course of its use. Polyester resins appeared attractive for inclusion in concrete surfacing compositions wherein a combination of economy and good chemical and physical properties were sought. It was soon found, however, that although the polyester resins displayed desirable cost and physical features, a serious drawback to their use was the relative weakness of the polyester-concrete bond, particularly under conditions of alternate freezing and thawing. Now, in accordance with this invention the polyesters are capable of such use and the mentioned difficulties are obviated.

It is an object of this invention, therefore, to provide a new non-skid formulation for concrete paving compositions. It is a further object to provide new flexible non-skid paving compositions which have excellent adhesion to concrete surfaces. It is a further object to provide new surfacing compositions which form flexible coatings having excellent skid-resistance and are resistant to wear, rain and hot and cold weather. A further object of the invention is the provision of new surface coatings which are relatively inexpensive and can easily be applied to roads, bridges, sidewalks, and other concrete surfaces. Other objects and advantages of the invention will be apparent from the following detailed description thereof.

In accordance with this invention there is provided a process for coating concrete which comprises removing contaminants from the surface, applying on the surface an alpha,beta unsaturated carboxylic acid primer and applying on the primed surface a polyester composition. The non-skid properties of the coating are further improved by spreading over the polyester surface a coating of finely divided inert abrasive particles.

The alpha,beta unsaturated carboxylic acids comprise a small and rather well defined class of organic acids. Among the acids in this class are isocrotonic, crotonic, maleic, fumaric, acrylic, methylacrylic, sorbic, cinnamic acids and maleic anhydride. It has been found that the bond between the resin coating and concrete is greatly increased when the acid employed is soluble in styrene monomer, and preferably when it is of infinite solubility therein. The preferred acids of this invention are the alpha,beta unsaturated alkylene carboxylic acids of 3 to 5 carbon atoms. Among the most preferred acids are acrylic, maleic and isocrotonic acids. The acid may be applied to the concrete surface by suitable spray, brush or roller means either as a full strength acid or may be mixed with a suitable diluent, such as a solvent, e.g., acetone, styrene and/or a polyester resin. The diluent may be preent from 10 to about 80 percent of the total acid solution.

The unsaturated polyesters useful in the invention are generally those known in the art, and generally constitute a reaction product of a polycarboxylic compound and a polyhydric alcohol. By polycarboxylic compounds are meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include maleic, chloromaleic, ethylmaleic, itaconic, citraconic, xeronic, pyrococinchoninic and acetylene dicarboxylic acids, either alone or in mixtures.

Illustrative of the unsaturated polyhydric alcohols having aliphatic carbon-to-carbon double bonds, which can be used in providing the unsaturation in the linear polyester molecules are compounds such as butenediol, pentenediol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, adipic, succinic, and mixtures thereof.

Suitable saturated polyhydric alcohols for use in the preparation of the polyester resins include ethylene glycol, diethylene glycol, propylene glycol, dipropylene glycol, butanediol, pentanediol, hexanediol, glycerol, mannitol, sorbitol, bisphenols, substituted bisphenols, hydrogenated bisphenols and mixtures thereof.

The properties of the polyesters can be varied by using mixtures of the various types of acids and alcohols, such as an unsaturated acid and a saturated acid with a saturated alcohol.

Often, it is desired to employ fire-resistant, unsaturated polyesters in the invention. Such polyesters may contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Other methods for incorporating either a polycarboxylic or polyhydric alcohol adduct of hexahalocyclopentadiene include: (1) the reaction of a polycarboxylic adduct of hexahalocyclopentadiene with an unsaturated polyhydric alcohol containing aliphatic carbon-to-carbon unsaturation, (2) the reaction of a polyhydric alcohol adduct of hexahalocyclopentadiene with a polycarboxylic compound containing aliphatic carbon-to-carbon unsaturation.

It is also within the scope of the invention to use other halogen-containing polyesters such as those derived from tetrachlorophthalic acid or anhydride. The polycarboxylic compounds and polyhydric alcohols for the production of the foregoing halogen-containing adducts and polyesters can be provided by using any of the compounds disclosed hereinbefore.

Additionally, the polyester resins may be modified to improve other properties, e.g., chemical resistance, for a particular application without departing from the scope of this invention.

Since the polyester resins described are frequently solids or viscous liquids, their use in paving applications is enhanced and facilitated by employment with them of a liquid polymerizable monomeric compound which serves as a diluent or solvent for the polyester resins, and which may be readily cured to a solid by copolymerization with the polymerizable components of the polyester. Such monomers are characterized by their possession of at least one olefinic bond, i.e., a $>C=C<$ linkage.

Suitable monomers include such well-known materials as styrene, vinyl toluene, diallyl phthalate, divinyl benzene, alpha-methyl styrene, methyl methacrylate and triallyl cyanurate. The monomer component may be conveniently employed in amounts up to about 70 percent by weight, preferably about 5 to about 50 percent of the combined styrene-polyester resin composition. By virtue of the polymerization of the monomer with the unsaturated components of the polyester, a desirable rigidity and homogeneity may be added to the entire composition. This polymerization or cure is conveniently achieved under the influence of a peroxide catalyst. However, any catalyst capable of initiating vinylic crosslinking, such as peracids and azo catalyst, e.g., azobis isobutyronitrile, are suitable. The curing reaction itself is exothermic and the heat thus evolved aids in speeding the cure. The polyester, together with the polymerizable monomer and the other ingredients of the paving composition, are employed in the forms of fluids, liquids or sand slurries which may be readily handled and applied to surfaces, and which are cured in place to yield solid paving surfaces. As catalysts or curing agents, organic peroxides give the best results in the composition, since they are inexpensive and may be easily added to the polyester-monomer mixture to give cures at room temperatures or slightly above. Examples of such catalysts include cumene hydroperoxide, benzoyl peroxide, di-tert butyl peroxide, lauroyl peroxide, and ketone peroxides such as methyl ethyl ketone peroxide, methyl vinyl ketone peroxide, mesityl oxide peroxide, and the like.

These curing agents may be added to the composition in their pure form, or they may be added in solution in such inert organic solvents as the phthalate esters, including dimethyl and dioctyl phthalate and as well as the cresyl phosphate esters. The concentration in which the curatives are used ranges from 0.01 percent by weight of the unsaturated polymer composition to about 10 percent by weight, while the preferred range is between about 0.1 percent and about 5 percent by weight of the unsaturated polyester resin.

A hydrocarbon wax is generally employed in the composition to prevent atmospheric oxygen from retarding surface curing of the coating. The hydrocarbon waxes migrate to the surface of the coating, thus providing thin layers that exclude oxygen until all the films have hardened. When so protected from the retarding effects of the oxygen, the coating compositions have cold curing characteristics, i.e., they will cure within a relatively short period of time without application of heat from an external source. A wide variety of hydrocarbon waxes may be employed for this purpose. The preferred hydrocarbon waxes are paraffin, montan, czocerite, ceresin, and mixtures thereof. Other materials may be employed such as beeswax, carnauba, sugar cane wax, polyethylene wax and the like. The proportion of hydrocarbon wax employed will vary depending on the solubility of the wax in the entire coating composition, however, from 0.02 to about 0.5 percent by weight of the plastic composition is suitable.

In addition to the curing agents, driers or accelerators may be used to promote the curing of the paving compositions of the invention under the conditions of use. In general, these driers include metal salts of organic acids (metal soaps), amines such as dibutyl amine and mercaptans such as dodecyl mercaptan. These accelerators include the cobalt, lead, manganese, calcium, zinc and iron soaps of organic acids. Preferred organic acids from which the metal soaps are prepared include naphthenic acid, octoic acid, stearic acid and lauric acid. Of these accelerators, the most preferred is cobalt naphthenate because of its better solubility and activity. Quantities of these accelerators which are used in the paving composition of the invention will depend, of course, on the nature of the polyester, peroxide curing agent and accelerator used, but in general amounts of accelerator between about 0.02 percent and 10 percent by weight, based on the polymer composition, have proved useful. When such accelerators are employed, improved cures, from the standpoint of heatless curing speed and ultimate hardness of the paving composition, are obtained.

The preceding discussion has been devoted to the composition and nature of the durable resinous binder that, in the invention, renders the non-skid surface adherent to the concrete surface. What gives the surface non-skid properties, however, is the inclusion in the binder of finely divided inert skidproof, i.e., abrasive particles. The particles of the paving composition must, of course, be solid and should preferably have a particle size between about 0.42 and about 4.76 millimeters. Particles of this size will pass through a U.S. Standard Sieve (1940) No. 4 but will be retained on a No. 40 sieve. Preferred materials include sand, crushed rock, crushed quartz, finely divided shells, aluminum oxide, finely divided resinous particles, glass particles, and the like. Particularly preferred because of their durability and low cost are the siliceous materials such as sand and crushed rock. Mixtures of such particles as are noted may also be used. The amount of the inert particles present in the paving composition to achieve suitable skidproof properties should be at least 25 percent by weight of the total composition, and may be from about 33 percent to about 95 percent of the total mass to the paving composition.

It is also within the scope of this invention to add reinforcing media to the polyester compositions to achieve a particular balance of physical properties desired. Such reinforcing media includes glass fibers, glass cloth, glass mats, glass roving, synthetic fibers made of acrylonitrile or nylon, mineral fibers such as asbestos, natural fibers such as wool or cotton and metallic fibers such as aluminum or steel.

Suitable fillers for use with the polyester compositions include inorganic materials such as calcium carbonate, clay and pigments such as zinc oxide and organic materials such as wood, flour, cotton and rayon flock, and dyes.

The paving compositions of the invention may be prepared by various suitable methods. The polyester resins mixed with the monomeric polymerizable organic compounds are generally fluids, and may be mechanically mixed together without the application of heat or the use of solvents. To the resulting mixture may be added the other ingredients, although the curing agent should not be added until the paving composition is to be cured. Thus, it is generally preferred to prepare the polyester resin-monomer-wax-accelerator compositions and curing agent compositions as two separate packages, and mix the two just before application to the surface to be treated. The curing agent may also be sprayed or otherwise added to the polyester resin and accelerator composition after it has been applied to the desired surface, but this procedure is less preferred. In general, the polyester resin and other ingredients are most conveniently applied to the underlying surface and the crushed quartz or other abrasive added to the resulting coating. Rollers, brushes, squeegees, brooms, sprayers, drippers and other road-coating devices may be used in application methods well known to those skilled in the floor surfacing and road coating arts.

Preferably, the surface to be so treated should be free of water, oil, grease, loose dirt and other substances that might interfere with the creation of a tenacious resin-surface bond. Thus, the surface can be washed with dilute acid or other cleaning medium, after which all trace of the cleaning agent should be removed from the surface, usually by flushing with water or other solvent. Use of steel brushes, detergent solutions or other cleaning means is also helpful. Equally effective cleaning methods include sand blasting, chipping and scouring.

The compositions of the invention may be applied to various surfaces, but are particularly suitable for coating concrete, wood and steel. The concrete may be of any of the usual types that are prepared from hydraulic cements, such as portland cement, and other types of aluminous and oxy salt-type cements. The paving compositions may be applied in very thin coatings or very thick coatings, e.g., one to ten pounds of resin per square yard, although the extremely economical coating density is achieved by using about four or five pounds of resin per square yard.

The paving compositions of my invention may also be employed as binders for aggregate in the construction of new roadways, airfield and walkways. In such instances the polyester resin, polymerizable monomer, air-impermeable organic material, i.e. wax, and other ingredients may be mixed with the aggregate in a cement mixer of other suitable type of mixer and then may be applied to the prepared roadway bed and cured in place. The amount of the binding composition required will depend, of course, on the nature and particle sizes of the aggregate employed, but it should be sufficient to produce a stable cohesive mass of paving. Roadways prepared in this manner and containing rocks about one-half to one inch in size are useful as warning or "rumble" strips for highways to warn motorists they are driving off the road. In such cases, the mixtures of resin composition and aggregate may be used in thicknesses up to about three inches, and applied with conventional paving equipment. In such applications, the resilence, adhesion and durability of our mixed rigid and flexible polyester resins show up to considerable advantage over the compositions of the art.

The following examples are presented to illustrate the invention further, but are not limiting. All parts and percentages are by weight and all temperatures are in degrees centigrade, unless otherwise indicated.

Example 1

A concrete slab was cleaned by sand blasting and then air blown so as to remove dirt, grease and foreign objects. On one third of the surface a film of acrylic acid was applied. To the next third of the concrete slab a film of acrylic acid water solution (1:1 ratio) was applied. Each primer was applied at the rate of one gallon per 100 square feet. The remaining third was left untreated as a control. Thereafter the treated slab was coated with a thixotropic, non-fire retardant, resilient polyester (known by the trade name Durez® 22293) specific gravity 1.12 at 25 degrees, Brookfield viscosity, #3 spindle, 2½ revolutions per minute, 118 poise at 25 degrees, catalyzed with about 0.5 percent by weight of methyl ethyl ketone peroxide and about 0.01 percent cobalt naphthenate. The resin coating was air cured for two days. The resin coating was then loosened from the concrete by forcing a wedge between the resin and concrete. The resin applied to the surface treated with acrylic acid had tightly bonded to it a layer of concrete ranging from 10 mils to ¼ inch thick. The portion over the 1:1 acid water solution had pieces of concrete substrate bonded to it. The cured resin released freely from the untreated surface.

Example 2

A section of an airport concrete surface in Peru, Indiana was scoured with a "Tennant Floor Machine, Model K4" which has a fixed tooth revolving drum. Thereafter, the area was swept clean and the surface was primed with a low viscosity primer consisting of 1 part acrylic acid, 1 part styrene and 3 parts of a commercial fire retardant semi-rigid polyester resin designated by the trade name "Hetron® 31'- and prepared from 1,4,5,6,7,7-hexachlorobicyclo-(2.2.1)-5-heptene-2,3-dicarboxylic acid, aliphatic glycols and styrene. This resin has a specific gravity of 1.28 at 25 degrees centigrade, viscosity (Brookfield method) of 1700 centipoise at 25 degrees and SPI gell time of 5 to 6.5 minutes. The primer was applied by means of long handled paint rollers at a rate of approximately 100 square feet per gallon. The primer was covered with a polyester resin (Hetron® 31) containing 10 percent chopped fiber glass and catalyzed with 0.5 percent (by weight of resin) of methyl ethyl ketone peroxide. The completed coating was approximately ¼ inch thick. Then a light layer of sand about 0.75 pound per square foot was spread on the surface. The coating was then cured at ambient temperature. After six months use the coating of this section remains tightly bonded to the concrete.

Example 3

Another section of airport concrete surface was treated in the manner of Example 2 except that the coating resin was a thixotropic non-fire retardant polyester resin known by the trade name Durez® 22293. After six months use the coating of this section remains tightly bonded to the concrete.

Various changes and modifications may be made and equivalents may be substituted in the method in the composition of this invention, certain preferred forms of which have been herein described, but without departing from the scope of this invention. Such modifications are to be regarded as within the scope of this invention.

What is claimed is:

1. A process for coating concrete which comprises applying to the surface an alpha,beta unsaturated carboxylic acid primer and spreading on the primed surface a thermosetting polyester resin composition.

2. The process of claim 1 wherein the alpha,beta unsaturated alkylene carboxylic acid primer contains 3 to 5 carbons.

3. The process of claim 1 wherein the alpha,beta unsaturated carboxylic acid primer is acrylic acid.

4. Concrete coated with an alpha,beta unsaturated carboxylic acid and over coated with a thermosetting polyester resin composition.

References Cited

UNITED STATES PATENTS 2,733,182    1/1956    Dalton et al. _____ 117—161 X
2,932,598    4/1960    Henning _____ 117—126 X ALFRED L. LEAVITT, Primary Examiner.

J. H. NEWSOME, Assistant Examiner.